United States Patent
Brunner et al.

(10) Patent No.: US 9,640,808 B2
(45) Date of Patent: May 2, 2017

(54) OPERATING METHOD FOR A FUEL CELL SYSTEM

(71) Applicant: Bayerische Motoren Werke Aktiengesellschaft, Munich (DE)

(72) Inventors: Tobias Brunner, Grasbrunn (DE); Manuel Tolosa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 219 days.

(21) Appl. No.: 14/495,080

(22) Filed: Sep. 24, 2014

(65) Prior Publication Data

US 2015/0072260 A1    Mar. 12, 2015

Related U.S. Application Data

(63) Continuation of application No. PCT/EP2013/053021, filed on Feb. 14, 2013.

(30) Foreign Application Priority Data

Mar. 26, 2012  (DE) .................. 10 2012 204 819

(51) Int. Cl.
*H01M 8/04*  (2016.01)
*H01M 8/04007*  (2016.01)
(Continued)

(52) U.S. Cl.
CPC ....... *H01M 8/04074* (2013.01); *F17C 13/005* (2013.01); *H01M 8/04029* (2013.01);
(Continued)

(58) Field of Classification Search
CPC .............................. H01M 80/04074
See application file for complete search history.

(56) References Cited

U.S. PATENT DOCUMENTS

| 6,753,105 B2 | 6/2004 | Fleck et al. |
| 7,360,368 B2 | 4/2008 | Fickel et al. |

(Continued)

FOREIGN PATENT DOCUMENTS

| DE | 103 48 385 A1 | 5/2005 |
| DE | 103 58 311 A1 | 7/2005 |

(Continued)

OTHER PUBLICATIONS

International Search Report (PCT/ISA/210) dated Jul. 25, 2013 with English translation (six pages).

(Continued)

*Primary Examiner* — Maria J Laios
(74) *Attorney, Agent, or Firm* — Crowell & Moring LLP

(57) ABSTRACT

An operating method is provided for a fuel cell system, in particular a fuel cell system in a motor vehicle. The system includes a cooling system via which waste heat of fuel cells of the fuel cell system is ultimately dissipated into the surrounding air, and a tank withstanding an internal pressure of the order of 150 bar and more. In the tank, fuel for the fuel cell system is stored in the cryogenic state, in particular as a cryogen, which tank has a heat exchanger in its storage volume, via which, in order to compensate for the pressure reduction resulting from the removal of fuel from the tank, heat can be supplied to the stored fuel in a controlled manner by way of a heat transfer medium. At operating points or in operating states of the fuel cell system in which the waste heat of the fuel cell system cannot be dissipated to the surroundings to the required extent, at least a portion of the waste heat from the fuel cells is supplied to the heat exchanger in the tank storing the fuel until a predefined limit value for the internal pressure in the tank is reached.

6 Claims, 2 Drawing Sheets

(51) Int. Cl.
    *F17C 13/00*     (2006.01)
    *H01M 8/04029*   (2016.01)
    *H01M 8/04082*   (2016.01)

(52) U.S. Cl.
    CPC ... *H01M 8/04208* (2013.01); *F17C 2221/012* (2013.01); *F17C 2223/0115* (2013.01); *F17C 2223/0161* (2013.01); *F17C 2227/0306* (2013.01); *F17C 2227/0309* (2013.01); *F17C 2227/0374* (2013.01); *F17C 2250/043* (2013.01); *F17C 2250/0439* (2013.01); *F17C 2270/0178* (2013.01); *F17C 2270/0184* (2013.01); *H01M 2250/20* (2013.01); *Y02E 60/321* (2013.01); *Y02T 90/32* (2013.01)

(56) References Cited

U.S. PATENT DOCUMENTS

| | | | |
|---|---|---|---|
| 7,377,235 B2 | 5/2008 | Turini et al. | |
| 8,454,730 B2 | 6/2013 | Von Helmolt et al. | |
| 2002/0177023 A1* | 11/2002 | Fleck | H01M 8/04 429/436 |
| 2005/0074657 A1 | 4/2005 | Rusta-Sallehy et al. | |
| 2010/0236259 A1* | 9/2010 | Brunner | F17C 1/00 62/48.1 |

FOREIGN PATENT DOCUMENTS

| | | |
|---|---|---|
| DE | 10 2004 045 636 A1 | 4/2006 |
| DE | 100 55 106 B4 | 7/2006 |
| DE | 10 2006 020 393 B4 | 7/2008 |
| DE | 10 2011 017 206 A1 | 11/2011 |
| EP | 2 217 845 B1 | 4/2011 |

OTHER PUBLICATIONS

German Search Report May 21, 2012 with partial English translation (10 pages).

\* cited by examiner

OPERATING METHOD FOR A FUEL CELL SYSTEM

CROSS REFERENCE TO RELATED APPLICATIONS

This application is a continuation of PCT International Application No. PCT/EP2013/053021, filed Feb. 14, 2013, which claims priority under 35 U.S.C. §119 from German Patent Application No. 10 2012 204 819.7, filed Mar. 26, 2012, the entire disclosures of which are herein expressly incorporated by reference.

This application contains subject matter related to U.S. application Ser. No. 14/494,985, entitled "Operating Method for a Cryopressure Tank" filed on even date herewith.

BACKGROUND AND SUMMARY OF THE INVENTION

The invention relates to an operating method for a fuel cell system, in particular in a motor vehicle, having a cooling system via which waste heat of the fuel cells of the fuel cell system is ultimately dissipated into the surrounding air, and having a tank withstanding an internal pressure of the order of 150 bar and more. Fuel for the fuel cell system is stored in the tank in a cryogenic state, in particular as a cryogen. The tank has a heat exchanger in its storage volume, via which, in order to compensate for the pressure reduction resulting from the removal of fuel from the tank, heat can be supplied to the stored fuel in a controlled manner by way of a heat transfer medium.

With regard to the prior art, in addition to DE 10 2011 017 206, reference is made in first instance, for example, to EP 2 217 845 B1, in which possible embodiments are described of an operating method for a cryopressure tank in which cryogenic hydrogen for supplying a fuel cell of a motor vehicle can be stored under supercritical pressure at 13 bar or more. In order to compensate for the pressure reduction resulting from the removal of hydrogen from the cryopressure tank, a heat transfer medium is supplied via a control valve to a heat exchanger provided in the cryopressure tank, or no supply of heat transfer medium into said heat exchanger takes place. In addition, a cryo-adsorptive storage device for hydrogen or other fuel gases is described in the first-mentioned DE 10 2011 017 206, which likewise can include a heat exchanger in order to heat the adsorbed gas within the storage container. Here, the waste heat of a fuel cell system (or the like) consuming the fuel gas can be utilized for supplying this heat exchanger.

Furthermore, different methods for cooling a fuel cell system primarily constructed from a multiplicity of individual fuel cells are known, for which reason reference is made, for example, to DE 103 48 385 A1 and DE 100 55 106 B4. In DE 103 48 385 A1, air cooling of a fuel cell system in a motor vehicle is described, while DE 100 55 106 B4 teaches that in the case of a liquid-cooled fuel cell system, in addition to heat dissipation to the surrounding air via the cooling liquid circuit, heat dissipation via the cooling liquid circuit also takes place to a heat exchanger provided outside of a reservoir for cryogenic hydrogen, in which heat exchanger the hydrogen removed from said reservoir is heated.

In particular in the case of a fuel cell system installed in a motor vehicle, significant fluctuations can occur in terms of the power required or to be output. It can be useful here not to dimension the conventional fuel cell system, which ultimately dissipates the waste heat into the surrounding air, in such a manner that, as it were, a maximally possible cooling capacity demand can be covered that is only needed in a few exceptional cases. The latter would mean that the cooling system of the fuel cell system would simply be over-dimensioned during, for example, 98% of the system operating time, which results in certain disadvantages in terms of installation space, weight and costs. If a higher cooling capacity demand indeed occurs in exceptional cases in a fuel cell system having a cooling system dimensioned for a cooling capacity requirement that is lower than the maximally possible cooling capacity requirement, it would then be necessary to reduce the power output of the fuel cell system.

However, the latter is undesirable, which is the reason why herein a corrective solution to this problem is to be provided. The solution is characterized in that at operating points or operating states of the fuel cell system in which the waste heat of the fuel cell system cannot be dissipated to the surroundings to the required extent, at least a portion of the waste heat from the fuel cells is supplied to the heat exchanger in the tank storing the fuel until a predefined limit value for the internal pressure in the tank is reached.

In other words, it is proposed herein to feed, upon occurrence of an extraordinary high cooling capacity demand, a portion of the waste heat of the fuel cell system into the tank containing the fuel for the fuel cell system. This proposed measure does not result in significant additional expenses since, upon removal of fuel from the tank, heat supply into the tank has to take place anyway so as to be able to allow simple removal of fuel from the tank also in such cases in which due to the removal of fuel a minimum pressure in the tank is reached, below which minimum pressure, based on the pressure difference alone, supplying to the fuel cell system is no longer ensured. However, such additional cooling by the cryogenic content of the tank can be carried out only until a predefined limit value for the internal tank pressure, which inevitably increases due to this heat supply, is reached. This predefined limit value should be lower than the maximum allowable internal tank pressure since the case may occur that upon reaching this predefined limit value, the vehicle is turned off, whereupon no pressure reduction through removal of fuel takes place, but the pressure in the tank can still slightly increase due to the unavoidable low heat input into the tank through the walls thereof.

The operating method proposed here is preferably carried out in a fuel cell system that uses hydrogen as a fuel that is stored in cryogenic form under supercritical pressure at 13 bar or more in a tank designed as a cryopressure tank, as described in the already-mentioned EP 2 217 845 B1. The particular advantage when using a cryopressure tank is that in such a tank, the stored hydrogen is usually under a pressure of far less than 2/3 of the allowable maximum pressure if only two thirds or less of the tank is filled. Thus, there is a relatively high potential of additional cooling capacity by means of the tank content in that the hydrogen in the tank is heated. This heating effects a pressure increase which, however, is not a problem as long as a predefined limit value for the internal tank pressure is not reached. Since, as already mentioned, upon removal of fuel from the tank, heat supply to the hydrogen in the tank for increasing the pressure takes place anyway if due to the removal of fuel a minimum pressure in the tank is reached, below which minimum pressure, based on the pressure difference alone, supplying to the fuel cell system is no longer ensured, such heat supply can also be provided in connection with an optionally required cooling of the fuel cell system. This optionally required cooling cannot be performed by the fuel cell system's conventional cooling system, which ultimately dissipates the heat into the surrounding air.

In a refinement of the invention, analogous to the mentioned EP 2 217 845 B1, fuel removed from the tank and heated in an external heat exchanger can be used as a heat transfer medium for the internal heat exchanger provided in the tank and can be supplied to the internal heat exchanger via a branch line branching off a supply line that leads to the consumer. After flowing through the internal heat exchanger, it can be fed into the supply line downstream of the branching-off point of the branch line. In this manner, no "foreign" medium is introduced into the tank while the waste heat of the fuel cells in the aforesaid operating points of an extraordinary high cooling capacity demand is supplied to the mentioned external heat exchanger. For the latter case, a liquid heat transfer medium is preferably used since therewith, while requiring a smaller installation space, larger heat quantities (from the fuel cell system to said external heat exchanger) can be transferred compared to the use of a gaseous heat transfer medium, e.g. air, although, depending on individual boundary conditions, using the latter is also possible and can in particular also be useful.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
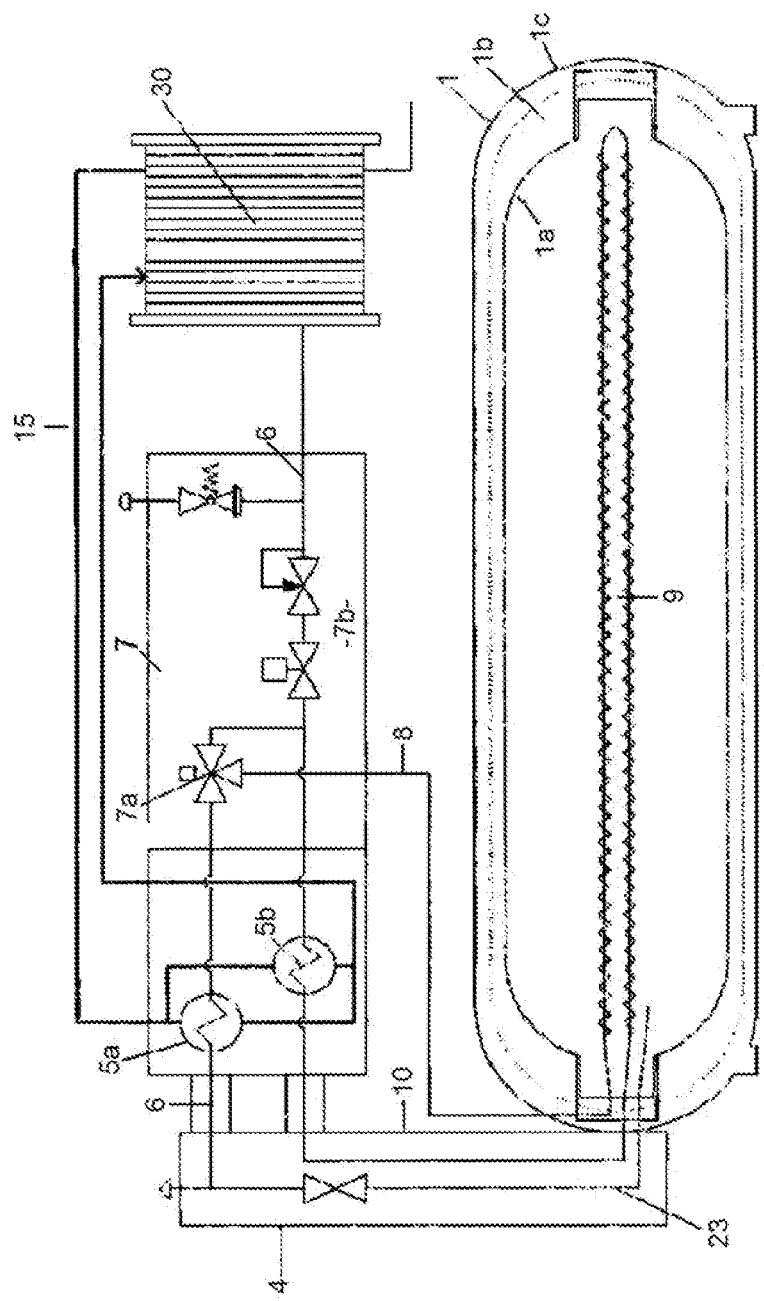
FIG. 1 is a schematic diagram principally showing a cryopressure tank with associated components for carrying out an embodiment of the operating method according to the invention.

Referring first to FIG. 1, a cryopressure tank 1 including its peripheral components necessary for understanding the present invention is principally illustrated here. In the cryopressure tank 1 (also referred to as tank 1), cryogenic hydrogen for supplying a fuel cell system 30, which is only shown in an abstract manner, can be stored at absolute pressure values of the internal tank pressure of the order of 150 bar or more, but at least under supercritical pressure at 13 bar and more. This cryopressure tank 1 consists of a pressure-resistant inner tank 1a, inside of which the cryogenic hydrogen is in a supercritical state, and also of an insulating layer 1b which surrounds the inner tank 1a and in which there is substantially a vacuum, and of an outer shell 1c enclosing said vacuum.

The inner tank 1a can be filled with cryogenic hydrogen in the supercritical state via a combined and thus single-flow filling and removal line 23, and hydrogen can be removed from the inner tank 1a via this filling/removal line 23, which extends or leads into a valve unit 4, which is only illustrated in an abstract manner and is not important for the present invention. For this, the valve unit 4 is connected to a first or external heat exchanger 5a through which, on the one side, a first heat transfer circuit 15 and secondly a supply line 6 are fed. The supply line 6 extends from the valve unit 4 and thereby connects to the filling/removal line 23, and finally leads to the fuel cell system 30. The supply line 6 is in heat-transferring communication with the first heat transfer circuit 15 via the heat exchanger 5a so that the hydrogen carried in the supply line 6 is heated in the external first heat exchanger 5a.

Downstream of the external first heat exchanger 5a, the supply line 6 is fed into a second valve unit 7, through which the supply line 6 is fed while passing through a tank pressure control valve 7a and a pressure control unit 7b before reaching the fuel cell system 30. A branch line 8 branches off from the tank pressure control valve 7a, through which branch line 8 the hydrogen removed from the cryopressure tank 1 and heated in the first (external) heat exchanger 5a is fed into a second (internal) heat exchanger 9 provided within the inner tank 1a of the cryopressure tank 1. After flowing through this second heat exchanger 9 provided within the cryopressure tank 1, more precisely, within the inner tank 1a thereof, this hydrogen is fed via a recirculation line 10 into the supply line 6 downstream of the branching-off point of the branch line 8. This recirculation line 10 is first fed through a third (external) heat exchanger 5b which is connected in parallel to the first (external) heat exchanger 5a and is supplied by the same heat transfer circuit 15, and in which the hydrogen cooled in the second heat exchanger 9 is heated again through heat exchange with the mentioned heat transfer circuit 15. Thus, the hydrogen fed through the branch line 8 and also through the second internal heat exchanger 9 and the recirculation line 10 acts as a heat transfer medium for heating the hydrogen stored in the cryopressure tank 1. Controlling or feedback controlling this heating takes place by supplying the heat transfer medium or hydrogen to the internal heat exchanger 9 and it is thus controlled or feedback-controlled by the switching strategy of the tank pressure control valve 7a, e.g., in such a manner that the pressure of the hydrogen in the tank 1 does not fall below a minimum value which, without using a pump or the like, is required for a secure supply of hydrogen to the fuel cell system 30 and which, e.g., can lie in the order of 5 bar. Another possible switching strategy of the tank pressure control valve 7a can provide that the temperature of the hydrogen located in the tank 1 does not fall below the critical temperature of hydrogen, which is 33.18 Kelvin. These feedback control criteria mentioned so far, depending on the filling level or filling state of the tank 1, can also be considered in parallel or sequentially, as described in the above-mentioned U.S. patent application Ser. No. 14/494,985 having the same priority date and filing date as the present application, and being entitled "Operating Method for a Cryopressure Tank," the content of which is incorporated by reference herein.

The fuel cell system 30 or the cooling system thereof is involved in the first heat transfer circuit 15 in such a manner that the waste heat resulting from the operation of the fuel cell system 30 can be dissipated at least in part to the heat exchangers 5a and 5b and via the latter to the hydrogen fed through the second internal heat exchanger 9 when a heat transfer medium is circulated via this heat transfer circuit 15 between the fuel cell system 30 and the heat exchangers 5a, 5b. For this, a feed pump that can be switched on or off is provided in the heat transfer circuit 15. In addition to the heat transfer circuit 15, another heat transfer circuit is provided, which is not illustrated figuratively, which uses the surrounding air as a temperature sink for dissipating the operation heat of the fuel cell system 30, and which is primarily used for cooling the fuel cell system 30.

Cooling the fuel cell system 30 via heat transfer circuit 15 and thus by involving the cooling potential of the hydrogen stored in the inner tank 1a of the cryopressure tank 1 takes place by starting up or operating the feed pump, for example, in those operating states of the cryopressure tank 1 in which heat supply into the inner tank 1 has to take place so as to either keep the temperature T of the hydrogen stored therein above the critical temperature of 33.14 Kelvin, or to keep the pressure p of this hydrogen above a minimum pressure $p_{min}$, as briefly described above. Cooling the fuel cell system 30 via the heat transfer circuit 15 and thus by involving the cooling potential of the hydrogen stored in the tank 1 by starting up or operating the feed pump also takes place in a case where a cooling capacity demand in/at the fuel cell system 30 is so high that this demand cannot be covered only by the heat transfer circuit which uses the surrounding air as its temperature sink.

Thus, when the fuel cell system 30 temporarily needs extremely high cooling that cannot be provided by the one heat transfer circuit or the heat transfer circuit using the surrounding air as a temperature sink (which is not illustrated in FIG. 1), it is possible, independent of the temperature T in the inner tank 1a of the cryopressure tank 1, to use the cooling potential of the hydrogen located in this inner tank 1a for cooling the fuel cell system 30 as long as the pressure p in the inner tank 1a does not increase, as a result of this additional heat supply into the tank 1a, beyond values above a predefined limit value or maximum pressure. Accordingly, at such a high cooling capacity demand of the fuel cell system 30, the feed pump and the control valve 7a are activated by a suitable electronic control unit, which in fact can be more useful than running the fuel system 30 in a special operating mode with significantly reduced power output due to danger of overheating.

Figure 2:
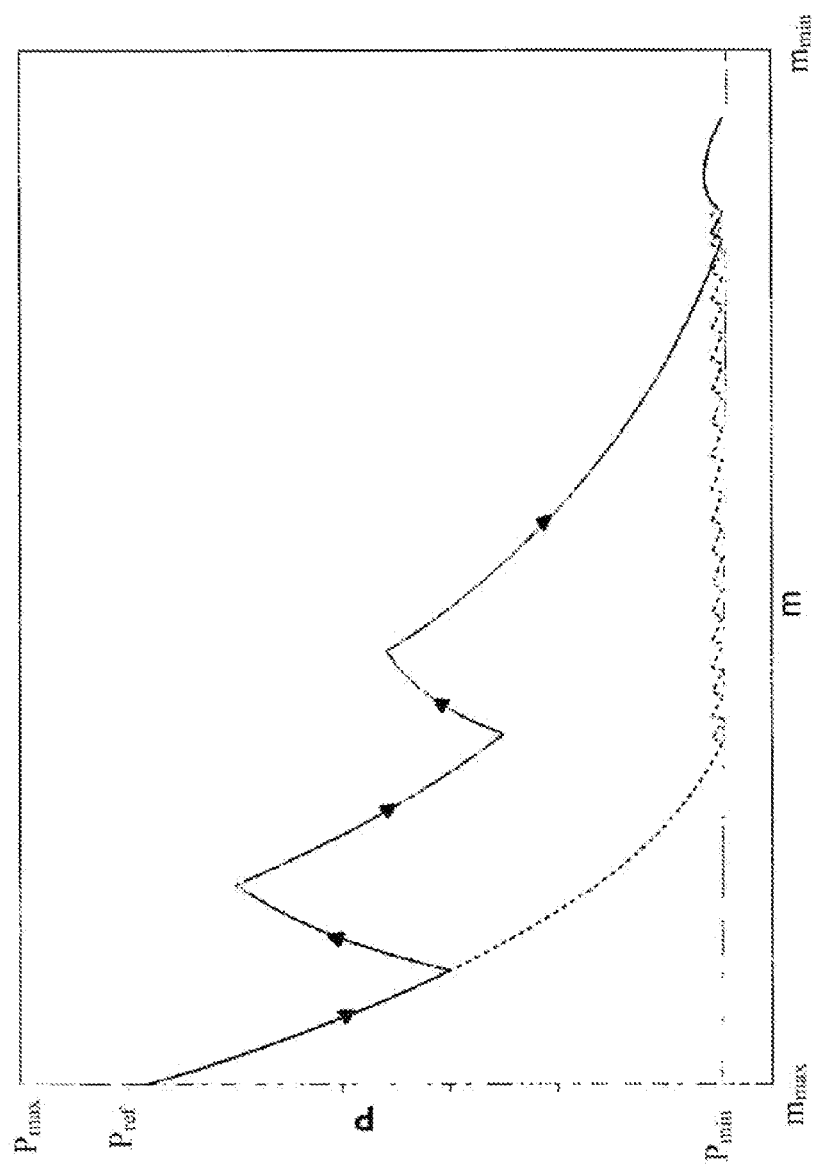
FIG. 2 is a graphical diagram showing, over a complete emptying process of the tank, an exemplary progression of the pressure of hydrogen stored in the tank, plotted on the ordinate, as a function of the mass of the hydrogen, plotted on the abscissa, located in the cryopressure tank of FIG. 1.

An exemplary progression of the pressure p as a function of the mass m of the hydrogen in the inner tank 1a is illustrated in FIG. 2 by a solid line for a plurality of such intensive cooling processes required in the course of completely emptying the tank. Those sections of the curve that exhibit an increase of pressure p as the mass m decreases illustrate a combined removal of hydrogen from the tank 1 and, at the same time, cooling of the fuel cell system 30 via the heat transfer circuit 15 according to the preceding explanations.

Furthermore, FIG. 2 also shows with a dashed line the progression of the pressure p as a function of the mass m during continuous removal of hydrogen from the tank 1 when no cooling that exceeds the normal cooling of the fuel cell system 30 with heat dissipation to the surroundings or no additional cooling by the cooling potential of the content of the tank 1 is required. It is apparent from the comparison of these two curves that with the intense heat input for cooling the fuel cell system 30 an otherwise, as it were, clocked heat supply (illustrated by the sawtooth profile of the dashed curve in FIG. 2) for maintaining the temperature of the hydrogen in the tank 1 above the critical temperature or the said minimum pressure $p_{min}$ for the supply to the fuel cell system 30 is no longer needed, but that in return, it is possible to appropriately feed at least a portion of the fuel cell system's waste heat into the tank 1 for the cooling demand of the fuel cell system 30.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a fuel cell system equipped with a cooling system via which waste heat of fuel cells of the fuel cell system is dissipated into surrounding air, and a tank designed to withstand an internal pressure of the order of 150 bar and more, the tank storing fuel in a cryogenic state and having a heat exchanger in its storage volume, the method comprising the acts of:
   supplying heat to fuel stored in the tank via a heat transfer medium of the heat exchanger in order to maintain pressure in the tank at a predefined internal pressure to compensate for a pressure reduction resulting from removal of fuel from the tank; and
   when the fuel cell system is at operating points or in operating states in which an amount of waste heat being generated by the fuel cells is greater than a heat dissipation capacity of the cooling system to the surrounding air, changing from supplying heat to the fuel in the storage tank to maintain the predetermined level to supplying at least a portion of the waste heat from the fuel cells to the heat exchanger in the tank in excess of an amount of heat required to maintain the predefined pressure level until a predefined limit value for the internal pressure in the tank is reached.

2. The method according to claim 1, further comprising the acts of:
   supplying fuel removed from the tank and heated in an external heat exchanger as the heat transfer medium for the heat exchanger in the storage volume, the supplying of the fuel being via a branch line that branches off from a supply line leading to the fuel cell system;
   feeding the heat transfer medium, after flowing through the heat exchanger in the tank, into the supply line downstream of the branching-off point of the branch line; and
   at said operating points or in said operating states, supplying a portion of the waste heat of the fuel cells to the external heat exchanger.

3. The method according to claim 2, wherein a liquid heat transfer medium is used for heat dissipation of the waste heat from the fuel cell system to the external heat exchanger.

4. The method according to claim 1, wherein the tank is a cryopressure tank storing cryogenic hydrogen under super-critical pressure at 13 bar or more as the fuel for the fuel cell system.

5. The method according to claim 2, wherein the tank is a cryopressure tank storing cryogenic hydrogen under super-critical pressure at 13 bar or more as the fuel for the fuel cell system.

6. The method according to claim 3, wherein the tank is a cryopressure tank storing cryogenic hydrogen under super-critical pressure at 13 bar or more as the fuel for the fuel cell system.

* * * * *